May 25, 1965 A. J. EHLSCHLAGER 3,185,898

PACKAGED ASSEMBLY FOR ELECTRONIC SWITCHING UNITS

Filed April 23, 1962 2 Sheets-Sheet 1

INVENTOR.
A. J. EHLSCHLAGER
BY S. Gundersen
ATTORNEY

May 25, 1965 A. J. EHLSCHLAGER 3,185,898

PACKAGED ASSEMBLY FOR ELECTRONIC SWITCHING UNITS

Filed April 23, 1962 2 Sheets-Sheet 2

INVENTOR.
A. J. EHLSCHLAGER
BY S. Gundersen
ATTORNEY

United States Patent Office 3,185,898
Patented May 25, 1965

3,185,898
PACKAGED ASSEMBLY FOR ELECTRONIC SWITCHING UNITS

Arthur J. Ehlschlager, Columbus, Ohio, assignor to Western Electric Company, Incorporated, New York, N.Y., a corporation of New York Filed Apr. 23, 1962, Ser. No. 189,511
2 Claims. (Cl. 317—101)

This invention relates to a packaged assembly for electronic switching units and specifically relates to the arrangement of a plurality of switching units utilizing semiconductor diodes as switching crosspoints on an input-output matrix.

With the present increase in volume of telephony traffic, additional electromechanical switching units are required. To facilitate the additional electromechanical switching units, an increased volume of equipment space is required. It is desirable, therefore, to provide a relatively compact switching unit to lessen the space requirement.

It is, therefore, an object of this invention to provide a new and improved packaged switching arrangement.

Another object of the invention is to arrange a plurality of switching units in a compact packaged fashion to facilitate the increasing switching volume requirements.

With these and other objects in mind, the present invention contemplates a switching unit having a plurality of input circuits connected to a plurality of output circuits through a plurality of high impedance-low current switching elements such as semiconductor PNPN diode crosspoints. In the operation of such a switching unit utilizing the PNPN diode crosspoints, a biasing arrangement is connected across each of the PNPN diode crosspoints wherein a potential of the biasing source is just below the breakdown potential of the diode. Upon the application of a signal from a customer's line on the input side of the circuit, a small potential is added to the existing biasing potential to cause a breakdown of the diode so that a low impedance-high current condition exists in the diode thereby allowing any signal which is transmitted from the customer to pass through the PNPN crosspoints.

A plurality of such switching units are combined in a compact fashion wherein the outputs of the initial units are connected to the inputs in a corresponding series of similar and succeeding switching units. In this manner, a relatively large volume of switching arrangements can be utilized in a compact area.

A complete understanding of this invention and of these and various other features thereof may be understood from the following detailed description of the accompanying drawings, in which.

Figure 1:
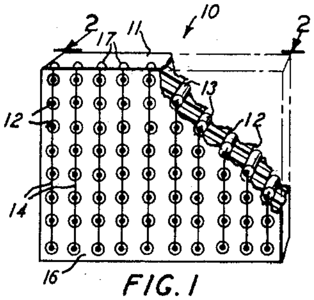
FIG. 1 is a perspective view of a switching unit with parts broken away for clarity showing vertical input conductors connected at a plurality of points to semiconductor diodes which are positioned within the block of insulation material.
Figure 2:
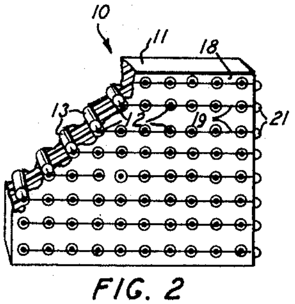
FIG. 2 is a perspective view of the switching unit, as viewed along line 2—2 of FIG. 1, showing a plurality of horizontal output conductors connected to corresponding semiconductor diodes which are connected to the vertical conductors as viewed in FIG. 1.
Figure 4:
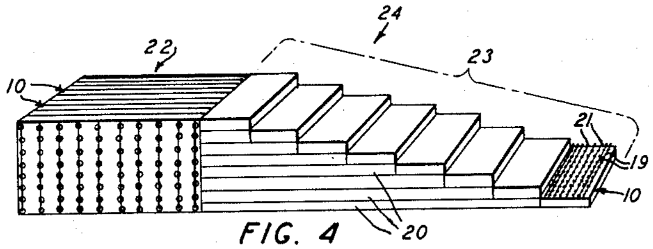
Figures 5, 6:
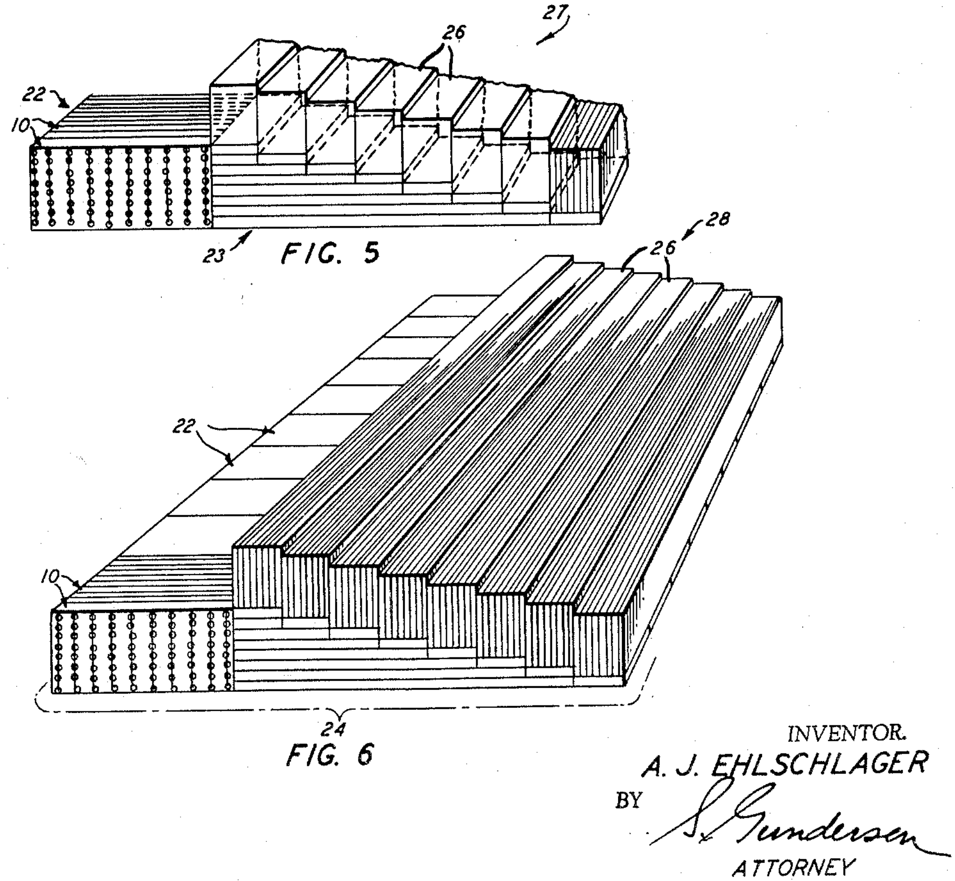
Figure 7:
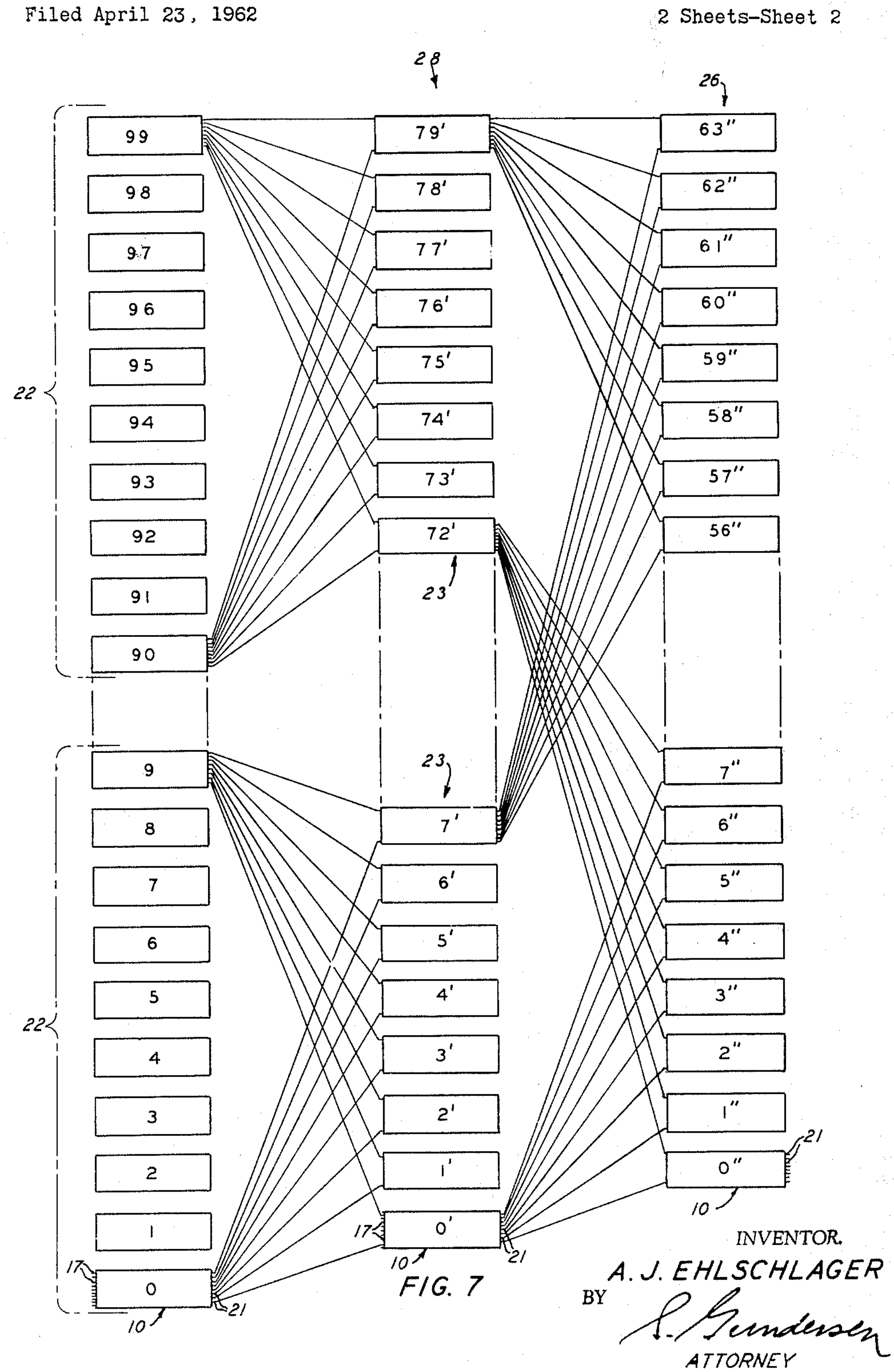

FIGS. 4, 5 and 6 are a variety of perspective views showing compact packaged assemblies of the switching units, as shown in FIGS. 1 and 2, and FIG. 7 is a diagrammatic view showing a plurality of individual blocks, each representing a switching unit as shown in FIGS. 1 and 2, wherein the units are assembled in a compact, packaged manner as shown in FIG. 6.

Referring to FIG. 1, a switching unit 10 consists of a board 11 composed of insulation material and is provided with a plurality of apertures 12. A corresponding plurality of PNPN semiconductor diodes 13 are positioned within the apertures 12 where one end of each vertical array of diodes 13 are connected to a plurailty of vertical conductors 14 on one side 16 of the board 11. A terminal 17 is connected to each of the vertical conductors 14. As shown in FIG. 2, on a reverse side 18 of the board 11, a plurality of horizontal conductors 19 are connected to opposite ends of the diodes 13 in a horizontal array. A terminal 21 is connected to each of the horizontal conductors 19.

It is to be noted that, as shown in FIGS. 1 and 2, there are ten vertical conductors representing ten input circuits to the unit 10 provided with the input terminals 17 and there are eight horizontal conductors 19 representing eight output circuits provided with the output terminals 21.

In operation, an input signal is applied to one of the terminals 17 and the corresponding vertical conductor 14. The signal aids in biasing one of the diodes 13 into conduction, as previously described, so that the signal is switched or transferred to the corresponding horizontal conductor 19 and the corresponding output terminal 21. In the event a previous signal is being switched from a given vertical conductor 14 to a given horizontal conductor 19, the present signal will pass to successive diodes 13 which are coupled to other horizontal conductors 19 and thereafter aid in biasing one of these diodes 13 into a state of conduction to switch the signal to a horizontal conductor 19 which is presently open. Thus, it is seen that as an input signal is applied to one of the input terminals 17, the signal will "search" the vertical array of diodes 13 for an open horizontal conductor 19 so that the input signal may be switched through the corresponding diode 13 to the output terminal 21.

Figure 3:
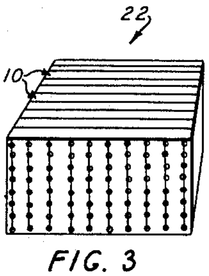
FIG. 3 is a perspective view showing a packaged assembly consisting of a plurality of switching units as shown in FIGS. 1 and 2.

As viewed in FIG. 3, ten switching units 10 are assembled in a compact package 22, which is provided with 100 input circuits and 80 output circuits. Although not shown, each unit 10 of the package 22 is provided with input terminals 17 (FIG. 1) and output terminals 21 (FIG. 2). In addition, ten packages 22 are represented in partial arrangement of FIG. 7, wherein the individual switching units of the ten packages 22 are numbered 0–99, inclusive, and each switching unit 10 is provided with the input terminals 17 (FIG. 1) and the output terminals 21 (FIG. 2).

As shown in FIG. 4, a stepped package 23 is provided with eight switching units 10, each having input terminals 17 (FIG. 1) and output terminals 21 (FIG. 2). A series of elongated boards 20 are interposed between the units 10 of the package 23 and the units 10 of the package 22 and are provided with conductive members for connecting the output terminals 21 (FIG. 2) of the package 22 to the input termnials 17 (FIG. 1) of the package 23. The output termnials 21 of each unit 10 of the package 22 and the input terminals 17 of each unit 10 of the package 23 are adapted to be connected to terminals provided on the conductive boards 20. Such a packaging arrangement provides a composite package 24 to facilitate a wider range of automatic switching for the 100 input circuits of the package 22. The stepped package 23 is provided with 64 output circuits wherein each step is provided with eight output circuits in a manner similar to the swtiching unit 10, as shown in FIG. 2. Therefore, an input signal applied to one of the vertical conductors 14 of the package 22 would "search" for an open switching diode 13 to bias the diode into a state of conduction thereby switching the signal to the corresponding horizontal conductor 19 and output terminal 21 of the package 22. As represented in FIG. 7, the switching units 10 of eight packages 23 are numbered 0′–79′, inclusive. The signal would be coupled to the input terminal 17 of a corresponding switching unit 10 of the stepped package 23 and thereafter "search" for an open diode 13 so that the diode 13 would be biased into a state of conduction to switch the signal to the corresponding horizontal conductor 19 and the output terminal 21 of he package 23. In this manner, a signal applied to any one of the 100 input circuits of the package 22 can be transmitted to any one of the 64 output terminals of the stepped package 23.

As viewed in FIG. 5, additional packaged assemblies 26 consisting of switching units substantially similar to the switching unit 10 are positioned on the stepped package 23 to provide a composite package 27. Each unit 10 is provided with input terminals 17 (FIG. 1) and output terminals 21 (FIG. 2) wherein the output terminals of the package 23 are adapted to be connected to the input terminals of the package 26 thereby providing additional switching circuits for the 100 input circuits of the package 22.

In FIG. 6, ten packaged units 24 are assembled in a side-by-side relation to receive eight elongated packages 26 on the stepped package 23 to provide a composite package 28. Each of the eight packages 26 consists of eight switching units 10 numbered 0″–63″, inclusive, as shown in FIG. 7.

As shown in FIGS. 6 and 7, a relatively compact switching arrangement is provided with 1,000 input circuits, provided by 100 switching units 10 numbered 0–99, inclusive, and 512 output circuits in package 28. An intermediate package consisting of 10 stepped packages 23 is shown as eightly switching units 10 numbered 0′–79′, inclusive. Thus, as previously described, individual signals applied to any of the terminals of the 1,000 input circuits are transmitted through the switching array, as shown in FIGS. 6 and 7, to the 512 output terminals. In this manner, 1,000 customer telephones could be connected to the input terminals 17 (FIG. 1) of the package 28 thereby providing a possibility of 512 outputs for the 1,000 customers at a given period. It is easily seen that a large volume of switching traffic can be controlled in a relatively compact area.

It is to be understood that the above-described arrangements are illustrative of the principles of the invention. Numerous other arrangements may be devised by those skilled in the art without departing from the spirit and scope of the invention.

What is claimed is:

1. An electronic switching unit for switching a plurality of signals from input circuits to output circuits comprising:
- an insulation panel,
- a plurality of electronic switches positioned in rows in the panel,
- a plurality of input conductors connected to the switches on a first side of the panel in a parallel array, and
- a lesser plurality of output conductors connected to the switches on a second side of the panel in a parallel array which is at right angles to the parallel array on the first side so that a signal applied to any of the input circuits may appear on any of the output circuits.

2. An electronic switching package for switching a plurality of signals from input circuits to output circuits, comprising:
- an insulation panel having a plurality of parallel, spaced rows of apertures,
- an electronic switching unit positioned within each aperture of the panel wherein leads extend in opposite directions from each switching unit to opposite apertured surfaces of the panel,
- a plurality of parallel input conductors connected to the leads of the switches extending toward a first apertured side of the panel wherein each conductor connects the switches aligned in a given row, and
- a plurality of parallel output conductors connected to the leads of the switch extending toward the opposite apertured surface of the panel wherein the parallel array of the output conductors is perpendicular to the parallel array of the input conductors and each conductor connects the switch aligned in a given row.

References Cited by the Examiner

UNITED STATES PATENTS 3,011,156 11/61 MacPherson -------- 340—166 XR
3,055,982 9/62 Kowalik ---------------- 179—18

ROBERT H. ROSE, *Primary Examiner.*

WALTER L. LYNDE, *Examiner.*